(No Model.) 2 Sheets—Sheet 1.
A. BUERKLE.
GAS BURNER.
No. 601,426. Patented Mar. 29, 1898.
FIG. 1.
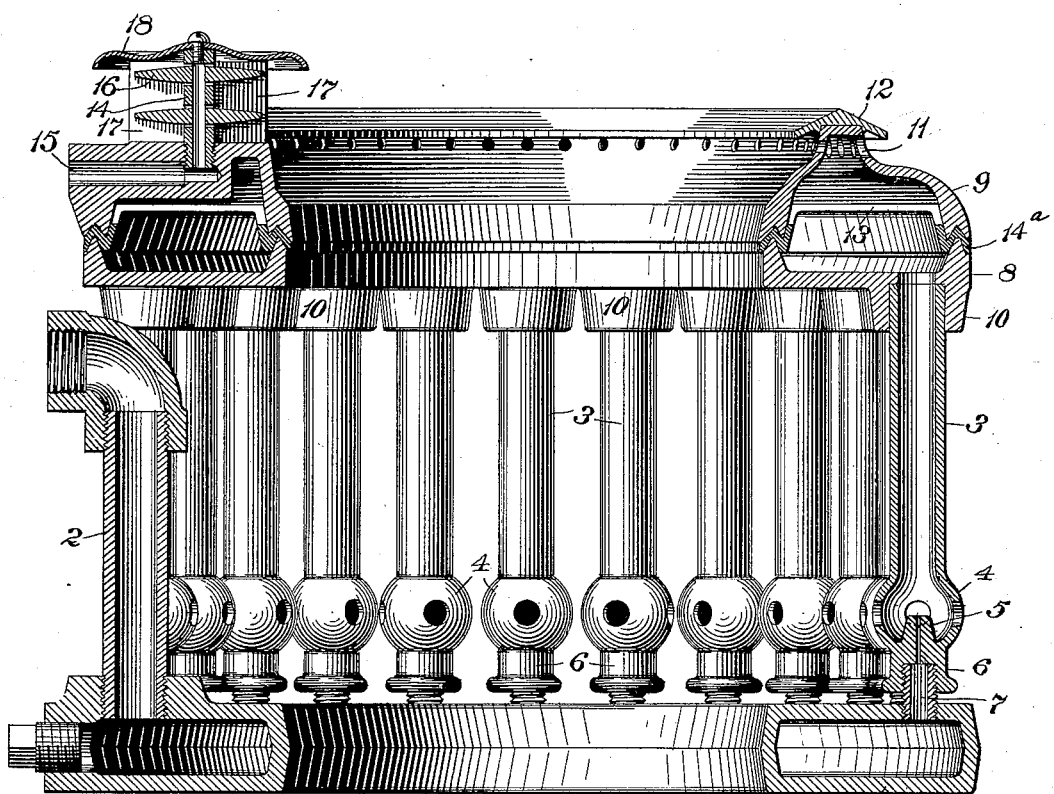
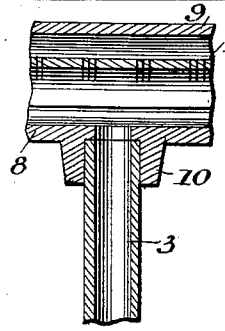
Fig. 3.
WITNESSES:
Chas. F. Miller
F. E. Gaither
INVENTOR,
August Buerkle
by Darwin S. Wolcott
Att'y.

(No Model.) 2 Sheets—Sheet 2.

A. BUERKLE.
GAS BURNER.

No. 601,426. Patented Mar. 29, 1898.

WITNESSES:
Chas. F. Miller.
J. E. Gaither.

INVENTOR.
August Buerkle
by Dennis S. Wolcott
Att'y.

UNITED STATES PATENT OFFICE.

AUGUST BUERKLE, OF ALLEGHENY, PENNSYLVANIA.

GAS-BURNER.

SPECIFICATION forming part of Letters Patent No. 601,426, dated March 29, 1898.

Application filed June 21, 1897. Serial No. 641,556. (No model.)

*To all whom it may concern:*

Be it known that I, AUGUST BUERKLE, a citizen of the United States, residing at Allegheny, in the county of Allegheny and State of Pennsylvania, have invented or discovered certain new and useful Improvements in Gas-Burners, of which improvements the following is a specification.

The invention described herein relates to certain improvements in gas-burners, and has for its object a construction and arrangement of parts whereby a proper mixture of gas, preferably of an illuminating character, and air may be effected for the economical use of such gas for heating purposes.

In general terms the invention consists in the construction and combination substantially as hereinafter more fully described and claimed.

Figure 2:
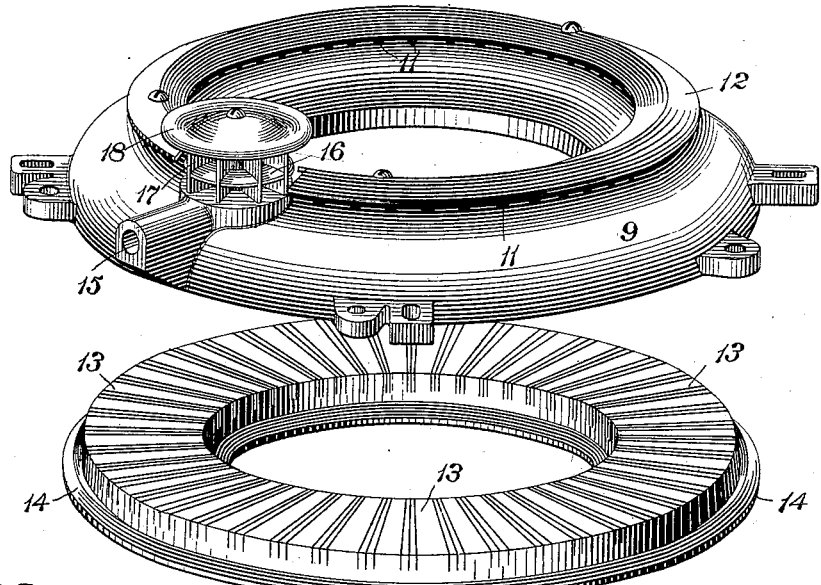
Figure 2:
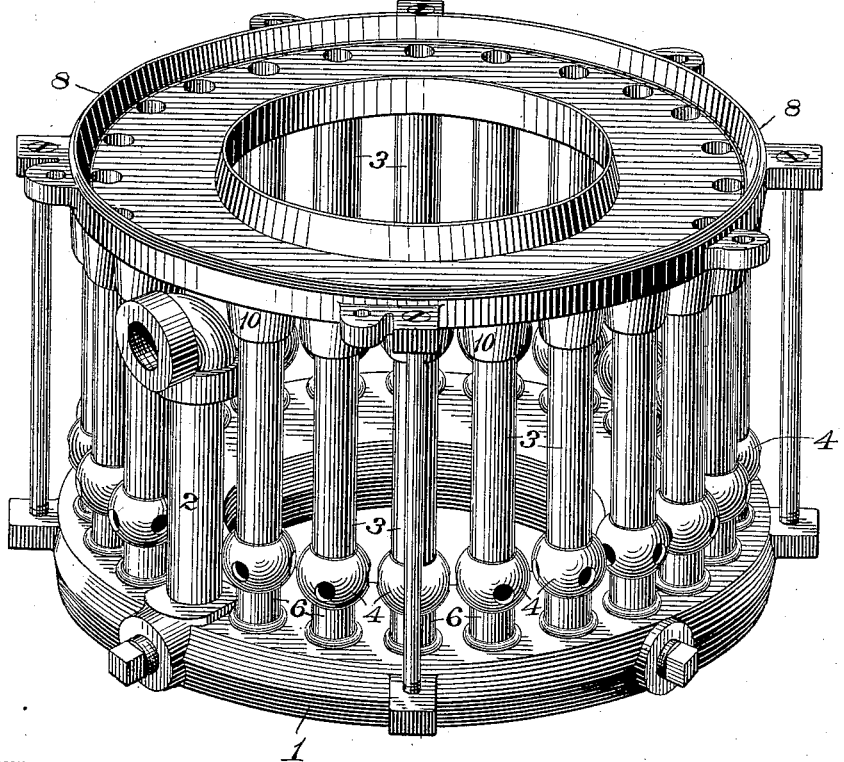

In the accompanying drawings, forming a part of this specification, Figure 1 is a view, partly in section and partly in elevation, of my improved burner; and Fig. 2 is a perspective view, the parts forming the upper portion of the burner being separated to more clearly illustrate their construction. Fig. 3 is a sectional detail view showing the relative arrangement of the burner-tubes and the mixing-diaphragm.

In the practice of my invention I provide a chamber 1, which in the present style of burner is made in the form of an annulus, and to this chamber is connected the gas-supply pipe 2. On the top of the chamber 1 is secured a series of tubes 3, provided at or near their lower ends with perforated bulbs or enlargements 4, into which project the nipples 5, having perforations therethrough for the flow of gas into the bulbs. These pipe-sections 3 may be connected in any suitable manner to the chamber 1, but are preferably provided at their lower ends with internally-threaded sockets 6, screwing onto hollow studs 7, which in turn are screwed into threaded openings through the upper wall in the chamber 1. As the gas flows from the chamber 1 up through the perforated nipples 5 it mingles with air flowing in through the perforations in the bulbs 4, and the commingled gas and air flows on up through the pipe 3 and into the mixing-chamber arranged on top of the pipes 3. This mixing-chamber is formed in two horizontal sections 8 and 9, the lower section 8 being provided with sockets 10 for the reception of the upper ends of the pipes 3. The upper section 9 is contracted to approximately a V shape, and through its walls near its apex are formed openings 11 for the lateral escape of the gas and air. On top of the section 9 is formed or secured a hood 12, constructed to project over the upper portion of the section 9 and prevent any water which may drop down on the hood from flowing in through the perforations 11 in the section 9, as clearly shown in Fig. 1. The mixing-chamber formed by the sections 8 and 9 is divided into two compartments by a diaphragm 13, which is preferably held in position by a concavo-convex flange 14$^a$, fitting on the V-shaped edge of the lower section 8 and also forming a correspondingly-shaped seat for the section 9. As shown in Fig. 1, this diaphragm 13 is provided in its body portion with a series of fine slits arranged transversely of the diaphragm for the passage of the gas from the upper to the lower compartments of the mixing-chamber. While the comparatively efficient commingling of the gas and air is effected in the tubes 3 and in the lower compartment of the mixing-chamber, such commingling is rendered complete by the interposition of the slitted diaphragm in the path of movement of the gas to the exit-holes 11.

It has been found that the slitted diaphragm is more effectual than a gauze diaphragm heretofore employed in effecting the mixture of the gas and air, and the slits are less liable to be clogged or stopped up by dirt and dust. It will be observed that the slits are arranged in sets, the spaces between adjacent sets being greater than those between adjacent slits of the same set. It is preferred that the sets of slits should be approximately double the number of the tubes 3 and that the diaphragm should be so arranged that the comparatively broad spaces between the sets of slits should be in line with the axes of the tubes, so that the streams and jets of gas and air will impinge upon the broad faces and will be broken up and diffused. The diaphragm, in addition to insuring a thorough commingling of the gas and air, will also serve to check or retard the rapidity of flow of the gas and air.

Upon the section 9 of the mixing-chamber is formed a pilot-light consisting, as shown in Fig. 1, of a central tube 14, secured upon the boss or shoulder 15 of section 9 and provided with a series of two or more flanges 16. The walls of this tube are perforated above, below, and between the flanges, which are also vertically slotted, as shown in Fig. 2, for the reception of the radial wings 17. These flanges, with their radial wings and cap 18, form a series of radial pockets in which the gas can burn, and the walls of these pockets will protect the flame therein from being blown out by sudden drafts.

The gas-receiving chamber 1 should be made of such a size or capacity, compared to the capacity of the perforations through the nipples 5, as to insure a regular distribution of gas to each nipple and an approximately even flow of gas through them. In addition to securing a more thorough mixture of gas and air the diaphragm will prevent the flashing back of the flame into the mixing-tubes.

I claim herein as my invention—

1. A gas-burner having in combination a gas-receiving chamber, a series of mixing-tubes connected to the receiving-chamber, and a mixing-chamber connected to the mixing-tubes, the upper portion of the mixing-chamber being contracted and having its side walls perforated, substantially as set forth.

2. A gas-burner having in combination a gas-receiving chamber, a series of mixing-tubes connected to the receiving-chamber, a mixing-chamber connected to the mixing-tubes, the upper portion of said chamber having its side walls perforated, and a hood projecting over the perforations, substantially as set forth.

3. A gas-burner having in combination a gas-receiving chamber, a series of mixing-tubes connected to the receiving-chamber, a mixing-chamber connected to the mixing-tubes and having its upper wall perforated for the escape of gas and air and a slitted diaphragm arranged in the mixing-chamber, substantially as set forth.

4. A gas-burner having in combination a gas-receiving chamber, a series of mixing-tubes connected to the receiving-chamber, a mixing-chamber connected to the mixing-tubes and having its upper wall perforated for the escape of gas and air and a diaphragm having slits arranged in sets and so located in the mixing-chamber that the slits are at one side of the axes of the mixing-tubes, substantially as set forth.

In testimony whereof I have hereunto set my hand.

AUGUST BUERKLE.

Witnesses:
DARWIN S. WOLCOTT,
F. E. GAITHER.